US010619878B2

(12) United States Patent
Doi et al.

(10) Patent No.: US 10,619,878 B2
(45) Date of Patent: Apr. 14, 2020

(54) INVERTER DRIVER OF AIR CONDITIONER (71) Applicant: DAIKIN INDUSTRIES, LTD., Osaka-shi, Osaka (JP)

(72) Inventors: Hirotaka Doi, Settsu (JP); Hiroshi Doumae, Settsu (JP); Takuji Koyama, Settsu (JP); Nobuyasu Hiraoka, Sakai (JP); Michiya Takezoe, Sakai (JP); Sumio Kagimura, Sakai (JP); Keito Kotera, Sakai (JP)

(73) Assignee: Daikin Industries, Ltd., Osaka (JP)

( * ) Notice: Subject to any disclaimer, the term of this patent is extended or adjusted under 35 U.S.C. 154(b) by 46 days.

(21) Appl. No.: 15/565,632

(22) PCT Filed: Mar. 28, 2016

(86) PCT No.: PCT/JP2016/059883
§ 371 (c)(1),
(2) Date: Oct. 10, 2017

(87) PCT Pub. No.: WO2016/167111
PCT Pub. Date: Oct. 20, 2016

(65) Prior Publication Data
US 2018/0073765 A1    Mar. 15, 2018

(30) Foreign Application Priority Data

Apr. 16, 2015   (JP) ................... 2015-083923

(51) Int. Cl.
*F24F 11/32*   (2018.01)
*H02M 7/48*    (2007.01)
(Continued)

(52) U.S. Cl.
CPC .............. *F24F 11/32* (2018.01); *F24F 11/86* (2018.01); *F24F 11/89* (2018.01); *F25B 49/022* (2013.01);
(Continued)

(58) Field of Classification Search
CPC .. F24F 11/32; F24F 11/86; F24F 11/89; F24F 11/30; F24F 11/88; F25B 49/022; H02P 29/0241; H02P 27/08; H02M 7/48
See application file for complete search history.

(56) References Cited

U.S. PATENT DOCUMENTS 5,113,665 A  *  5/1992  Katsuki ................... F24F 11/30
                                                62/126
2009/0007579 A1 *  1/2009  Natsume ............... F25B 49/025
                                                62/236

(Continued)

FOREIGN PATENT DOCUMENTS

EP    2 809 002 A1    12/2014
JP    58-163272 A     9/1983
(Continued)

OTHER PUBLICATIONS

International Preliminary Report of corresponding PCT Application No. PCT/JP2016/059883 dated Oct. 26, 2017.
(Continued)

*Primary Examiner* — Nelson J Nieves
(74) *Attorney, Agent, or Firm* — Global IP Counselors, LLP (57) ABSTRACT An inverter driver of an air conditioner drives an inverter of an actuator that actuates the air conditioner. The inverter driver includes a drive circuit outputting a drive signal to the inverter, a microcomputer controlling the drive circuit, a first mechanical relay connected to the drive circuit, and an inverter control power supply continually supplying power to the microcomputer. The first mechanical relay is capable of cutting off an inverter drive power supply of the drive circuit or cutting off the drive signal of the drive circuit. The first mechanical relay cuts off the inverter drive power supply of the drive circuit or the drive signal of the drive (Continued)

circuit when an abnormality in the air conditioner has been sensed and stopping the driving of the actuator has been requested.

14 Claims, 4 Drawing Sheets

(51) Int. Cl.
    *H02P 27/08* (2006.01)
    *F24F 11/89* (2018.01)
    *H02P 29/024* (2016.01)
    *F24F 11/86* (2018.01)
    *F25B 49/02* (2006.01)

(52) U.S. Cl.
    CPC .............. *H02M 7/48* (2013.01); *H02P 27/08* (2013.01); *H02P 29/0241* (2016.02)

(56) References Cited

U.S. PATENT DOCUMENTS

| | | | | |
|---|---|---|---|---|
| 2009/0103336 A1* | 4/2009 | Nakamura | ............... | H02M 1/32 363/52 |
| 2010/0296206 A1* | 11/2010 | Doumae | ............... | G01R 31/025 361/42 |
| 2012/0033334 A1* | 2/2012 | Saruwatari | ............... | H02P 27/06 361/22 |
| 2015/0029619 A1* | 1/2015 | Nakashita | ............ | H02H 7/0833 361/22 |
| 2016/0301203 A1* | 10/2016 | Curry | ........................ | F24F 11/89 |
| 2016/0327304 A1* | 11/2016 | Tsuji | ..................... | F24F 1/0003 |
| 2017/0191689 A1* | 7/2017 | Fujihira | ................... | F24F 11/89 |
| 2017/0207739 A1* | 7/2017 | Ang | .................... | H02P 21/0021 |
| 2017/0214355 A1* | 7/2017 | Yamakawa | ........... | H02P 27/085 |
| 2017/0222596 A1* | 8/2017 | Kuroki | .................... | H02P 25/03 |
| 2017/0314801 A1* | 11/2017 | Enya | ........................ | F24F 11/89 |
| 2017/0328593 A1* | 11/2017 | Enya | ........................ | F24F 11/89 |

FOREIGN PATENT DOCUMENTS

| | | |
|---|---|---|
| JP | 8-149833 A | 6/1996 |
| JP | 2007-107781 A | 4/2007 |
| JP | 4151188 B2 | 7/2008 |
| JP | 2010-181110 A | 8/2010 |
| JP | 2012-70595 A | 4/2012 |
| WO | WO-2013118574 A1 * | 8/2013 ........... H02H 7/0833 |

OTHER PUBLICATIONS

International Search Report of corresponding PCT Application No. PCT/JP2016/059883 dated May 31, 2016.
European Search Report of corresponding EP Application No. 16 77 9202.2 dated Dec. 17, 2018.

\* cited by examiner

VOLTAGE (V1) FOR DRIVING INVERTER

FIG. 5

VOLTAGE (V3) OF CONTROL BOARD POWER SUPPLY

FIG. 6

VOLTAGE (V2) OF INVERTER CONTROL POWER SUPPLY

FIG. 7

PWM SIGNAL (PWMS)

FIG. 8

HIGH-PRESSURE ABNORMALITY NOTIFICATION SIGNAL (HPS)

FIG. 9

SECOND MECHANICAL RELAY (RY2)

FIG. 10

FIRST MECHANICAL RELAY (RY1)

FIG. 11

VOLTAGE (PA) OF INVERTER DRIVE POWER SUPPLY

FIG. 12

GATE SIGNAL (GS) OF PWM DRIVE CIRCUIT

FIG. 13

COMPRESSOR (comp)

FIG. 14

ABNORMAL
HIGH-PRESSURE
SENSING SIGNAL
(HPSS)

FIG. 15

MASKING

INVERTER DRIVER OF AIR CONDITIONER

CROSS-REFERENCE TO RELATED APPLICATIONS

This U.S. National stage application claims priority under 35 U.S.C. § 119(a) to Japanese Patent Application No. 2015-083923, filed in Japan on Apr. 16, 2015, the entire contents of which are hereby incorporated herein by reference.

TECHNICAL FIELD

The present invention relates to an inverter driver of an air conditioner that drives an inverter of an actuator provided in an air conditioner.

BACKGROUND ART

Air conditioners in recent years have been using many inverter-driven actuators, such as motors driven by inverters. For example, there are air conditioners where a compressor is rotated by a motor that is driven by an inverter. And there are air conditioners where the inverter of the inverter-driven compressor is controlled by a microcomputer, such as disclosed in JP A No. 2007-107781 and Japanese Patent No. 4,151,188.

SUMMARY

Technical Problem

In the air conditioner disclosed in patent document 1, in a case where an abnormality occurs in the air conditioner and the compressor is to be stopped, the microcomputer is informed of the abnormality, and an inverter drive waveform signal output from the microcomputer to the inverter is changed to stop the inverter. Moreover, a power supply line connected to the inverter is cut off to forcibly disconnect the supply of the drive voltage to the inverter.

However, a semiconductor device is used to change the inverter drive waveform signal of the microcomputer, and a semiconductor device is also used when forcibly cutting off the supply of the drive voltage to the inverter. In this way, if a semiconductor device is used to stop the compressor when an abnormality has been sensed, the certainty with which the compressor is stopped ends up being dependent on the reliability of the semiconductor device.

It is a problem of the present invention to improve the certainty with which the driving of an actuator driven by an inverter is stopped when an abnormality has been sensed in an air conditioner and stopping the driving of the actuator has been requested.

Solution to Problem

An inverter driver of an air conditioner pertaining to a first aspect of the invention is an inverter driver that drives an inverter of an actuator that actuates the air conditioner, the inverter driver comprising: a drive circuit outputting a drive signal to the inverter; a microcomputer controlling the drive circuit; a first mechanical relay being connected to the drive circuit capable of cutting off an inverter drive power supply of the drive circuit or capable of cutting off the drive signal of the drive circuit; and an inverter control power supply continuing supplying power to the microcomputer, wherein the first mechanical relay cuts off the inverter drive power supply of the drive circuit or the drive signal of the drive circuit when an abnormality in the air conditioner has been sensed and stopping the driving of the actuator has been requested.

In the inverter driver of the first aspect, the inverter drive power supply or the drive signal of the drive circuit is cut off by the first mechanical relay when an abnormality has been detected in the air conditioner and stopping the driving of the actuator has been requested, so contacts switch to a mechanically unconnected state because the contacts are mechanically opened and closed inside the first mechanical relay. The drive signal with respect to the inverter is certainly changed as a result of the contacts becoming mechanically opened inside the first mechanical relay, and the inverter that had been driven is certainly stopped.

An inverter drive of the air conditioner pertaining to a second aspect of the invention is the inverter driver pertaining to the first aspect, further comprising an abnormality notification signal transmission circuit transmitting an abnormality notification signal to the microcomputer, wherein the first mechanical relay includes a common contact connected to the inverter drive power supply of the drive circuit, a break contact connected to the drive circuit, and a make contact connected to the abnormality notification signal transmission circuit.

In the inverter driver of the second aspect, the first mechanical relay is configured to include the common contact connected to the inverter drive power supply of the drive circuit, the break contact connected to the drive circuit, and the make contact connected to the abnormality notification signal transmission circuit, so abnormality sensing can be swiftly and certainly performed, and the microcomputer can be reduced from erroneously sensing an abnormality other than an abnormality involving the first mechanical relay.

An inverter driver of the air conditioner pertaining to a third aspect of the invention is the inverter driver pertaining to the first aspect or the second aspect, further comprising a first connection port actuating the first mechanical relay to open when a stop request regarding the actuator has been received and thereby disconnect the inverter drive power supply of the drive circuit or the drive signal of the drive circuit.

The inverter driver of the third aspect further comprises the first connection port, so a device one wants to have output a request to stop the driving of the actuator can be connected to the first connection port, and the first mechanical relay can be actuated in such a way that ordinarily the first connection port is closed by that device and when an abnormality has been detected the first connection port is opened by that device to disconnect the inverter drive power supply of the drive circuit or the drive signal of the drive circuit.

An inverter driver of the air conditioner pertaining to a fourth aspect of the invention is the inverter driver pertaining to the third aspect, further comprising: a second mechanical relay connected to the first connection port and receives a stop request regarding the actuator; and a first board and a second board that are separate from each other and to which the first mechanical relay and the second mechanical relay are respectively attached.

In the inverter driver of the fourth aspect, the first mechanical relay is attached to the first board, and the second mechanical relay is attached to the second board that is separate from the first board, so the second board can be provided in a place where the first board is not provided, and a device one wants to have output a request to stop the driving of the actuator can be provided in a place where it is easy to connect so that connection of the second mechanical relay and that device can be easily carried out. For example, if the first board is provided in a closed-off place, the second board can be provided in an openable place, and connection of the second mechanical relay and that device can be easily carried out.

An inverter driver of the air conditioner pertaining to a fifth aspect of the invention is the inverter driver pertaining to the third aspect or the fourth aspect, further comprising a second connection port connected in series to the first connection port and the first mechanical relay. The second connection port is connected to an emergency stop circuit that is opened in an emergency stop situation.

In the inverter driver of the fifth aspect, the second connection port is connected in series to the first connection port and the first mechanical relay, so the line including the first connection port and the first mechanical relay can be opened by the second connection port even if the first connection port is not opened, and because of the emergency stop circuit the first mechanical relay can certainly change the drive signal with respect to the inverter to certainly stop the inverter that had been driven.

An inverter driver of the air conditioner pertaining to a sixth aspect of the invention is the inverter driver pertaining to any of the first aspect to the fifth aspect, wherein the actuator is a compressor, and the first mechanical relay cuts off the inverter drive power supply of the drive circuit or the drive signal of the drive circuit when a high-pressure abnormality in the compressor has been sensed and stopping the driving of the compressor has been requested.

In the inverter driver of the sixth aspect, when an abnormality in the air conditioner has been sensed, the inverter that had driven the compressor is certainly stopped.

An inverter drive of the air conditioner pertaining to a seventh aspect of the invention is the inverter driver pertaining to any of the first aspect to the sixth aspect, wherein when the inverter driver is powered on, the microcomputer performs masking that hinders from performing of control that causes the drive circuit to make the actuator nm until the first mechanical relay connects the inverter drive power supply of the drive circuit or the drive signal of the drive circuit from a cut off state.

In the inverter driver of the seventh aspect, masking is performed by the microcomputer when the inverter driver is powered on, so even when the microcomputer quickly switches to a working state, a glitch where the microcomputer tries to cause the drive signal to be output from the drive circuit while the disconnection of the drive circuit by the first mechanical relay is not cancelled can be avoided.

An inverter driver of the air conditioner pertaining to an eighth aspect of the invention is the inverter driver pertaining to any of the first aspect to the seventh aspect, wherein when stopping the driving of the actuator has been requested, the microcomputer performs control that causes the drive circuit to output the drive signal so as to stop the inverter.

In the inverter driver of the eighth aspect, there are cases where the inverter is stopped by the microcomputer quicker than in a case where the inverter is stopped by just the first mechanical relay, and in such cases the time until stopping when there is an abnormality in the actuator can be further shortened.

Advantageous Effects of Invention

In the inverter driver of the air conditioner pertaining to the first aspect of the invention, when an abnormality in the air conditioner has been sensed and stopping the driving of the actuator has been requested, the driving of the inverter can be certainly stopped and the certainty with which the driving of the actuator is stopped is improved.

In the inverter driver pertaining to the second aspect of the invention, the inverter driver with which the stopping of the inverter drive power supply of the drive circuit and abnormality sensing can be swiftly and certainly performed can be inexpensively provided.

In the inverter driver pertaining to the third aspect of the invention, a device that senses an abnormality in the air conditioner and requests the stopping of the driving of the actuator can be easily connected using the first connection port.

In the inverter driver pertaining to the fourth aspect of the invention, connection of the first mechanical relay and the device that requests the stopping of the driving of the actuator when an abnormality in the air conditioner has been sensed becomes easy through the intervention of the first connection port and the second mechanical relay.

In the inverter driver pertaining to the fifth aspect of the invention, the driving of the inverter can be certainly stopped using the first mechanical relay and the emergency stop circuit, and the certainty with which the driving of the actuator is stopped by the emergency stop circuit is improved.

In the inverter driver pertaining to the sixth aspect of the invention, the compressor can be certainly stopped by the first mechanical relay.

In the inverter driver pertaining to the seventh aspect of the invention, the occurrence of glitches at the time of the startup of the air conditioner caused by using the first mechanical relay that is slow to work is prevented.

In the inverter driver pertaining to the eighth aspect of the invention, the protection of the actuator can be improved.

DESCRIPTION OF EMBODIMENT

An inverter driver that drives an inverter of an actuator that actuates an air conditioner pertaining to an embodiment of the invention will be described below taking as an example an inverter driver that drives an inverter of a compressor of an air conditioner. First, the configuration of the air conditioner to which the inverter driver is applied will be briefly described.

(1) Overview of Configuration of Air Conditioner

Figure 1:
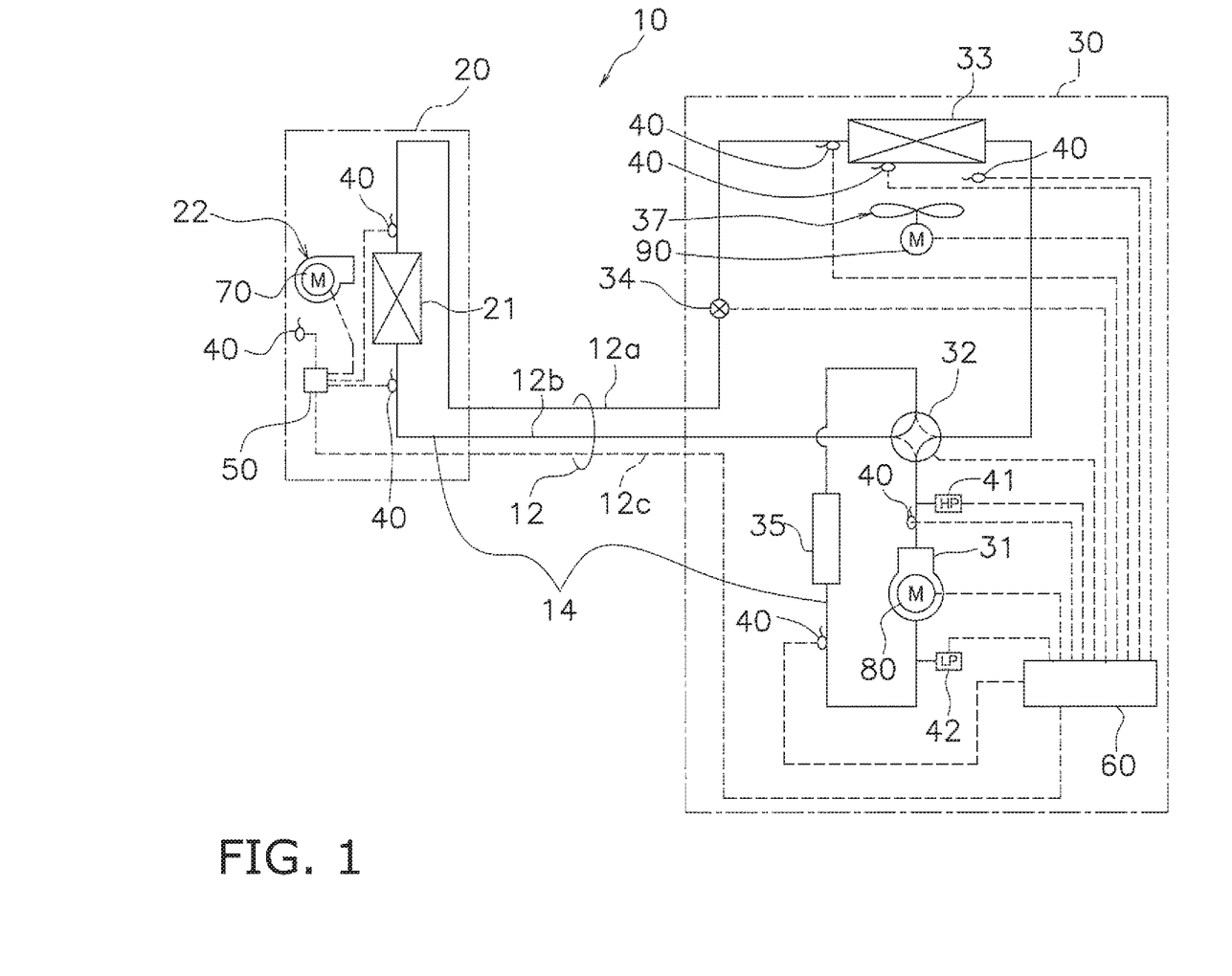
FIG. 1 is a circuit diagram showing an overview of the configuration of an air conditioner to which an inverter driver pertaining to an embodiment is applied.

FIG. 1 is a circuit diagram showing an overview of the configuration of an air conditioner 10. In FIG. 1, solid lines interconnecting devices represent refrigerant pipes, and dashed lines interconnecting devices represent transmission lines. To configure a refrigerant circuit 14 shown in FIG. 1, for example, an indoor unit 20 is provided with an indoor heat exchanger 21, an outdoor unit 30 is provided with a compressor 31, a four-port switching valve 32, an outdoor heat exchanger 33, an electrically powered valve 34, and an accumulator 35, and the indoor unit 20 and the outdoor unit 30 are connected to each other by connection pipes 12. Refrigerant circulates in the refrigerant circuit 14.

Here, the circuit configuration of the refrigerant circuit 14 will be briefly described. A first port of the four-port switching valve 32 is connected to the discharge side of the compressor 31. To a second port of the four-port switching valve 32 is connected one inlet/outlet of the outdoor heat exchanger 33, to a third port is connected the accumulator 35, and to a fourth port is connected a refrigerant connection pipe 12b. During cooling, the first port and the second port of the four-port switching valve 32 are connected to each other and the third port and the fourth port of the four-port switching valve 32 are connected to each other as indicated by the solid lines. During heating, the first port and the fourth port of the four-port switching valve 32 are connected to each other and the second port and the third port of the four-port switching valve 32 are connected to each other as indicated by the dashed lines. The other inlet/outlet of the outdoor heat exchanger 33 is connected via the electrically powered valve 34 and a refrigerant connection pipe 12a to one inlet/outlet of the indoor heat exchanger 21. The other inlet/outlet of the indoor heat exchanger 21 is connected via the refrigerant connection pipe 12b to the fourth port of the four-port switching valve 32. Furthermore, the suction side of the compressor 31 is connected via the accumulator 35 to the third port of the four-port switching valve 32.

Furthermore, the indoor unit 20 and the outdoor unit 30 are controlled by an indoor control component 50 and an outdoor control component 60. The indoor control component 50 and the outdoor control component 60 are connected to each other via a communication line 12c and send data to and receive data from each other. The indoor control component 50 and the outdoor control component 60 are each configured to include a central processing unit (CPU), a memory, and peripheral circuits.

Various sensors are connected to the indoor control component 50 of the indoor unit and the outdoor control component 60 of the outdoor unit 30. The various sensors include temperature sensors 40 for measuring temperatures at different sections, a high-pressure abnormality sensing component 41 that senses high-pressure abnormality of the refrigerant discharged by the compressor 31, and a pressure sensor 42 for measuring the pressure of the refrigerant sucked in by the compressor 31. The high-pressure abnormality sensing component 41 is, for example, a high-pressure pressure sensor.

Furthermore, in the indoor unit 20, an inverter motor 70 of an indoor fan 22 is connected to the indoor control component 50. In the outdoor unit 30, an inverter motor 80 of the compressor 31, the four-port switching valve 32, the electrically powered valve 34, and an inverter motor 90 of an outdoor fan 37 are connected to the outdoor control component 60. The indoor control component 50 controls the rotational speed and the operation/stopping of the inverter motor 70. Furthermore, the outdoor control component 60 controls the motor speed and the operation/stopping of the inverter motor 80 of the compressor 31 and the inverter motor 90 of the outdoor fan 37, the switching of the four-port switching valve 32, and the opening degree of the electrically powered valve 34.

(2) Configuration of Inverter Driver

The inverter motors 70, 80, and 90 and the indoor fan 22, the compressor 31, and the outdoor fan 37 that include those inverter motors are actuators that actuate the air conditioner 10. Here, actuators provided in the air conditioner 10 and inverter drivers that drive inverters for supplying alternating-current voltage to those actuators will be described taking the compressor 31 and the inverter motor 80 as an example.

Figure 2:
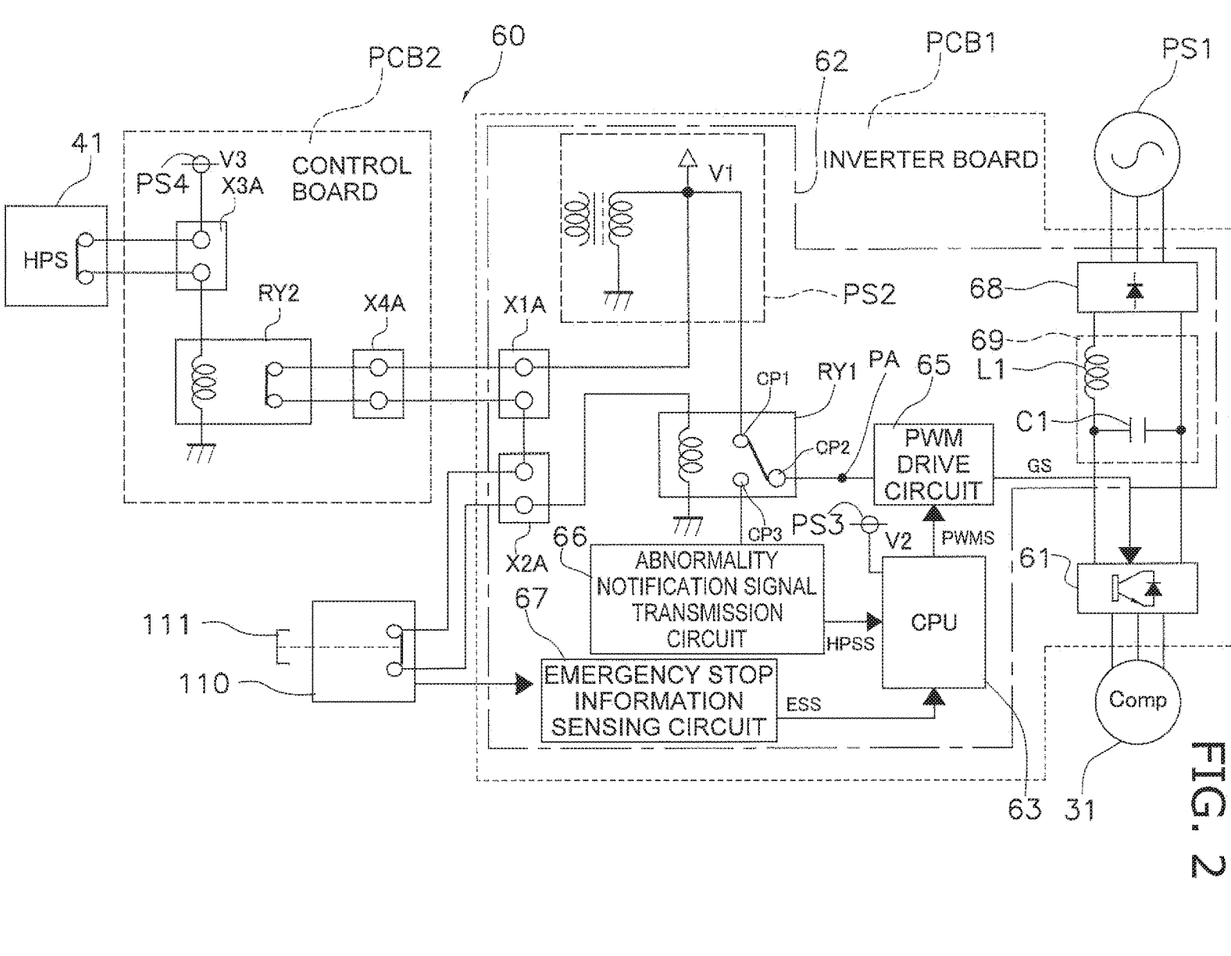
FIG. 2 is a circuit diagram showing a connection relationship between an outdoor control component and a compressor.

FIG. 2 is a circuit diagram showing the connection relationship between the outdoor control component 60 and the compressor 31. It will be noted that the circuit diagram shown in FIG. 2 shows a state when the outdoor unit 30 is in operation and an abnormality is not being sensed.

The outdoor control component 60 includes an inverter board PCB1 and a control board PCB2.

Mounted on the inverter board PCB1 are an inverter 61 and an inverter driver 62 that drives the inverter 61. The inverter 61 is connected to the compressor 31, and alternating-current voltage is supplied from the inverter 61 to the compressor 31. The inverter 61 uses pulse width modulation (PWM) control to convert direct-current voltage output from a later-described filter circuit 69 to alternating-current voltage.

The inverter driver 62 is equipped with a rectifier circuit 68 and a filter circuit 69. The rectifier circuit 68 is connected to a commercial power supply PS1. The rectifier circuit 68 rectifies alternating-current voltage supplied from the commercial power supply PS1 to direct-current voltage. The filter circuit 69 is connected to the rectifier circuit 68. The filter circuit 69 includes a reactor L1 and a capacitor C1 and performs noise filtering such as controlling harmonic current with the inductance of the reactor L1 and smoothing the ripple component of the direct-current voltage output from the rectifier circuit 68 with the capacitance of the capacitor C1. The inverter 61 is connected to the filter circuit 69.

The inverter driver 62 performs PWM control with respect to the inverter 61. For the PWM control, the inverter driver 62 is equipped with a PWM drive circuit 65. The PWM drive circuit 65 is a circuit for driving the inverter 61 and sends a gate signal GS to the inverter 61. The gate signal GS is a drive signal for driving the inverter 61.

Figure 10:
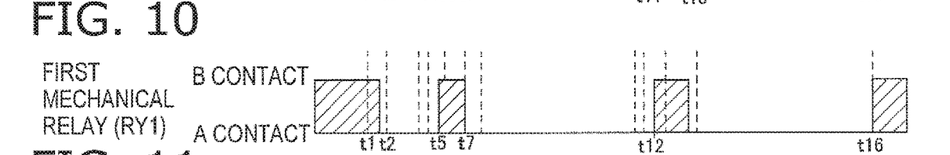
FIG. 10 is a timing chart showing the switching of a first mechanical relay RY1.

A voltage V1 (e.g., DC 15 V) is supplied to the inverter driver 62 from an inverter drive power supply PS2 for driving the PWM drive circuit 65. Furthermore, the inverter driver 62 is equipped with a first mechanical relay RY1 for cutting off the inverter drive power supply PS2 from the PWM drive circuit 65. A common contact CP1 of the first mechanical relay RY1 is connected to the inverter drive power supply PS2, the PWM drive circuit 65 is connected to a break contact CP2 ("A contact" in FIG. 10) of the first mechanical relay RY1, and an abnormality notification signal transmission circuit 66 is connected to a make contact CP3 ("B contact" in FIG. 10) of the first mechanical relay RY1.

The inverter driver 62 is equipped with a central processing unit (CPU) 63, the abnormality notification signal transmission circuit 66, and an emergency stop information sensing circuit 67, and an inverter control voltage V2 (e.g., DC 15 V) is supplied from an inverter control power supply PS3 to the CPU 63. The CPU 63 transmits to the PWM drive circuit 65 a PWM signal PWMS that applies information needed for the PWM drive circuit 65 to generate the gate signal GS. The abnormality notification signal transmission circuit 66 transmits a abnormal high-pressure sensing signal HPSS to the CPU 63 when the make contact CP3 is on and the voltage V1 is applied from the inverter drive power supply PS2 to the abnormality notification signal transmission circuit 66. The CPU 63 that has received the abnormal high-pressure sensing signal HPSS stops the PWM drive circuit 65. Furthermore, the emergency stop information sensing circuit 67 senses information instructing an emergency stop and applied from the outside of the inverter driver 62. When the emergency stop information sensing circuit 67 senses information instructing an emergency stop, it transmits an emergency stop signal ESS to the CPU 63. The CPU 63 that has received the emergency stop signal ESS stops the PWM drive circuit 65. The inverter control power supply PS3 is supplied to the inverter board PCB1 independently of the inverter drive power supply PS2, so that even if the inverter control power supply PS2 is cut off by the first mechanical relay RY1, the state in which the inverter control power supply PS3 is supplied to the CPU 63 is maintained.

The inverter driver 62 is equipped with a first connection port X1A and a second connection port X2A that are connected in series to each other. The first connection port X1A and the second connection point X2A are break contacts. The first mechanical relay RY1 has a coil to which the voltage V1 is applied from the inverter drive power supply PS2 via the first connection port X1A and the second connection port X2A. When the voltage V1 is being applied to the first mechanical relay RY1, the common contact CP1 and the break contact CP2 are connected to each other. When the voltage V1 is not being applied to the first mechanical relay RY1, the common contact CP1 and the make contact CP3 are connected to each other. An emergency stop circuit 110 is connected to the second connection port X2A. A button switch 111, for example, is provided in the emergency stop circuit 110, and the button switch 111 is configured to be pressed when the user judges that an emergency stop is necessary. When the button switch 111 is pressed, the button switch 111 opens and the second connection port X2A also opens. Furthermore, when the button switch 111 is pressed, the emergency stop circuit 110 sends to the emergency stop information sensing circuit 67 information instructing an emergency stop.

A voltage V3 (e.g., DC 15 V) is supplied from a control board power supply PS4 to the control board PCB2. Mounted on the control board PCB2 are a third connection port X3A, a second mechanical relay RY2, and a fourth connection port X4A.

The voltage V3 is applied via the third connection port X3A to a coil of the second mechanical relay RY2. A break contact of the second mechanical relay RY2 becomes connected while current flows in the coil of the second mechanical relay RY2. The third connection port X3A is connected to the high-pressure abnormality sensing component 41. When the high-pressure abnormality sensing component 41 connected to the third connection port X3A senses a high-pressure abnormality, the high-pressure abnormality sensing component 41 switches off and the supply of the voltage V3 to the coil of the second mechanical relay RY2 is cut off.

The break contact of the second mechanical relay RY2 is connected to the fourth connection port X4A, and the fourth connection port X4A is connected to the first connection port X1A. The connection between the second mechanical relay RY2, the fourth connection port X4A, and the first connection port X1A is a connection where the fourth connection port X4A becomes open when the second mechanical relay RY2 becomes open and where the first connection port X1A also becomes open when the fourth connection port X4A becomes open. Stated conversely, the fourth connection port X4A and the first connection port X1A both close when the second mechanical relay RY2 closes.

(3) Working of Inverter Driver

Figure 3:
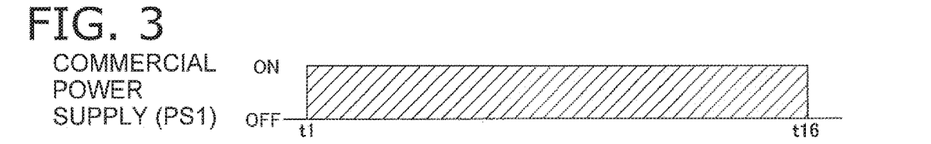
FIG. 3 is a timing chart showing if there is commercial power.
Figure 4:
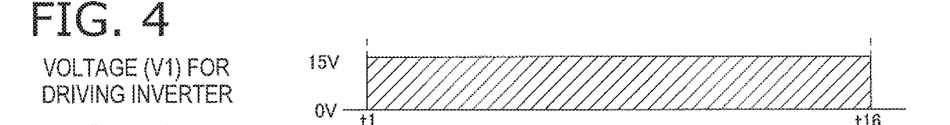
FIG. 4 is a timing chart showing a change in a voltage V1 for driving an inverter.
Figure 5:
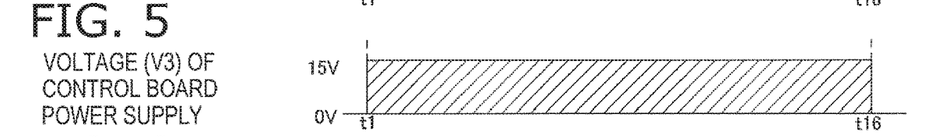
FIG. 5 is a timing chart showing a change in a voltage of a control board power supply.

The working of the inverter driver 62 will be described with reference to FIG. 3, FIG. 4, and FIG. 5. In the air conditioner 10 including the outdoor unit 30, until the point in time at time t1, the commercial power supply PS1 is off, so power is not supplied to the control board PCB2 or the inverter board PCB1, operation is stopped, and the voltage V1 of the inverter drive power supply PS2, the inverter control voltage V2 of the inverter control power supply PS3, and the voltage V3 of the control board power supply PS4 are all 0 V. For that reason, until the point in time at time t1, the CPU 63, the PWM drive circuit 65, the abnormality notification signal transmission circuit 66, and the emergency stop information sensing circuit 67 do not work. Furthermore, until the point in time at time t1, the common contact CP1 and the make contact CP3 of the first mechanical relay RY1 are connected to each other and the second mechanical relay RY2 is open.

Figure 11:
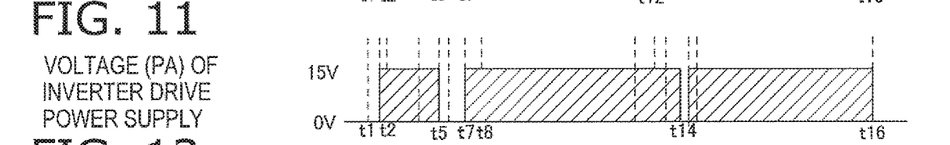
FIG. 11 is a timing chart showing changes in a voltage of an inverter drive power supply applied to a PWM drive circuit.

At time t1, when the commercial power supply PS1 is switched on, the inverter drive power supply PS2, the inverter control power supply PS3, and the control board power supply PS4 are switched on, the voltages V1 and V3 become 15 V, and V2 becomes 5 V, the inverter control voltage V2 is applied to the CPU 63 and the voltage V3 is applied to the second mechanical relay RY2. For the voltage V3 to be applied to the second mechanical relay RY2, it is necessary for the high-pressure abnormality sensing component 41 to be on, that is, sending a signal indicating that it is normal, so there are cases where the voltage V3 is applied to the second mechanical relay RY2 a little later than the timing when power comes on. From when the second mechanical relay RY2 opens to until the first mechanical relay RY1 switches from the make contact CP3 to the break contact CP2, a response lag equal to the amount of time needed for the switching of the contact connection in the first mechanical relay RY1 arises. Consequently, there is a little lag from when the voltage V1 of the inverter drive power supply PS2 is supplied to the inverter board PCB1 to until the voltage V1 is applied to the PWM drive circuit 65 as shown in FIG. 11.

Devices made of semiconductors, such as the CPU 63 and the abnormality notification signal transmission circuit 66, generally have a faster rate of rise compared to devices that need to work mechanically, such as the first mechanical relay RY1. If the CPU 63 and the abnormality notification signal transmission circuit 66 start working quicker, there is the potential for a glitch such as a malfunction to occur. For example, if the abnormality notification signal transmission circuit 66 starts working in a state in which the common contact CP1 and the make contact CP3 of the first mechanical relay RY1 are connected to each other, there is the potential for the abnormal high-pressure sensing signal HPSS to end up being transmitted from the abnormality notification signal transmission circuit 66. Furthermore, if the CPU 63 starts working in a state in which the common contact CP1 and the make contact CP3 of the first mechanical relay RY1 are connected to each other, there is the potential for the CPU 63 to end up outputting the PWM signal PWMS to the PWM drive circuit 65 which is stopped because the voltage V1 is not yet being applied from the inverter drive power supply PS2 to the PWM drive circuit 65. If the PWM signal PWMS is partially missing in this way, there are cases where trouble arises in the driving of the inverter motor 80 of the compressor 31. Or, in a case where the rise of the voltage V3 of the control board power supply PS4 of the control board PCB2 is slower relative to the inverter control voltage V2, there are cases where, even in a state in which the CPU 63 has started working, the second mechanical relay RY2 of the control board PCB2 is not closed, the first connection port X1A of the inverter board PCB1 is open, and the CPU 63 erroneously senses a high-pressure abnormality despite the fact that there is no high-pressure abnormality.

Figure 15:
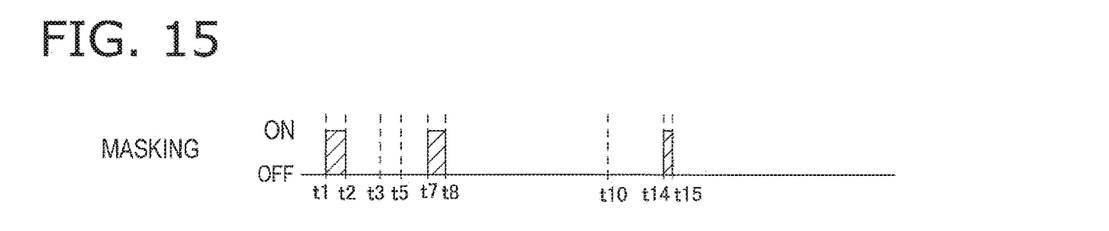
FIG. 15 is a timing chart showing periods in which a CPU performs masking in which the CPU does not perform control with respect to the PWM drive circuit.

Therefore, the CPU 63 is equipped with a masking function that suspends control for a predetermined certain period from when the inverter control voltage V2 is supplied from the inverter control power supply PS3. As shown in FIG. 15, the CPU 63 stays in a standby state without performing control for a certain period (t2-t1) from time t1 to time t2.

At time t2, when the masking period has elapsed after the inverter control voltage V2 is applied from the inverter control power supply PS3, the state is always the one shown in FIG. 2. When the PWM signal PWMS is transmitted from the CPU 63 to the PWM drive circuit 65 at the timing of time t2, the gate signal GS is transmitted from the PWM drive circuit 65 to the inverter 61. Additionally, alternating-current voltage is supplied from the inverter 61 to the inverter motor 80 of the compressor 31, and operation of the compressor 31 is started.

There are two kinds of cases where the compressor 31 stops because of a high-pressure abnormality in which a high-pressure abnormality has been sensed by the high-pressure abnormality sensing component 41 after operation of the compressor 31 has been started: a case where the compressor 31 stops as a result of the voltage V1 of the inverter drive power supply PS2 being cut off by the first mechanical relay RY1; and a case where the compressor 31 stops as a result of the transmission of the PWM signal PWMS from the CPU 63 being stopped.

(3-1) Case where Compressor 31 Stops Because of First Mechanical Relay RY1

Figure 12:
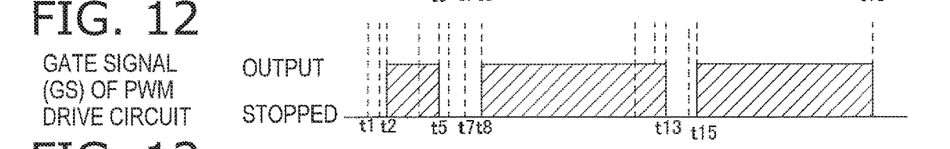
FIG. 12 is a timing chart for describing timings when a gate signal of the PWM drive circuit is stopped.
Figure 13:
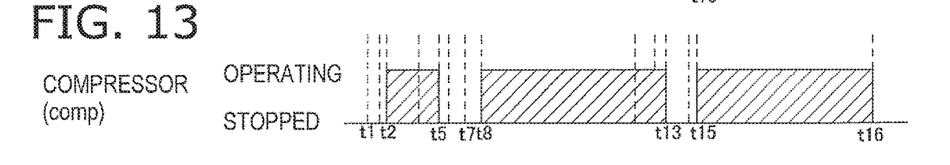
FIG. 13 is a timing chart for describing timings when the compressor is operating and stopped.

The working from when the high-pressure abnormality notification signal HPS is transmitted at time t3 to until the operation of the compressor 31 is stopped is working when the compressor 31 stops because of the first mechanical relay RY1. At this time, at time t4 the second mechanical relay RY2 becomes open, and at time t5 a little later the first mechanical relay RY1 switches from the break contact CP2 (A contact) to the make contact CP3 (B contact). The voltage V1 of the inverter drive power supply PS2 becomes 0 V at the same time as the switching of the first mechanical relay RY1. As a result, the transmission of the gate signal GS from the PWM drive circuit 65 is stopped as shown in FIG. 12 and the operation of the compressor 31 is stopped as shown in FIG. 13. It will be noted that at time t6 the transmission of the PWM signal PWMS from the CPU 63 to the PWM drive circuit 65 is stopped, but because the PWM drive circuit 65 is already off at this time, the stopping of the transmission of the PWM signal PWMS does not affect the stopping of the operation of the compressor 31.

Figure 8:
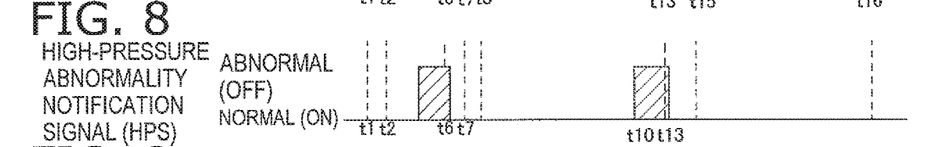
FIG. 8 is a timing chart showing changes in a high-pressure abnormality notification signal that is output by a high-pressure abnormality sensing component.
Figure 9:
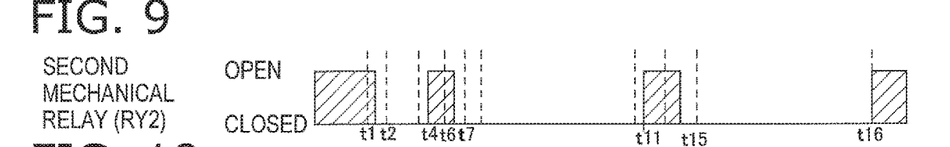
FIG. 9 is a timing chart showing the opening and closing of a second mechanical relay.

Furthermore, as shown in FIG. 8, a little after time t6 the high-pressure abnormality is eliminated and the high-pressure abnormality notification signal HPS from the high-pressure abnormality sensing component 41 is cancelled. As shown in FIG. 9, the second mechanical relay RY2 closes a little after the cancellation of the high-pressure abnormality notification signal HPS. As a result of the second mechanical relay RY2 closing, the fourth connection port X4A and the first connection port X1A close and the first mechanical relay RY1 switches from B contact to A contact. As a result, the voltage V1 is applied to the PWM drive circuit 65, and output of the gate signal GS from the PWM drive circuit 65 becomes possible. Here, the CPU 63 performs masking from the abnormality notification signal transmission circuit 66 considering the lag time between from the cancellation of the high-pressure abnormality notification signal HPS and to until the voltage V1 is applied to the PWM drive circuit 65, and the CPU 63 starts the transmission of the PWM signal PWMS from the CPU 63 to the PWM drive circuit 65 from time t8 a little after the output of the abnormality notification signal from the abnormality notification signal transmission circuit 66 stops. As a result, the transmission of the gate signal GS from the PWM drive circuit 65 is started, and the application of the alternating-current voltage by the inverter 61 and the operation of the compressor 31 are resumed.

(3-2) Case where Compressor 31 Stops Because of CPU 63

Figure 7:
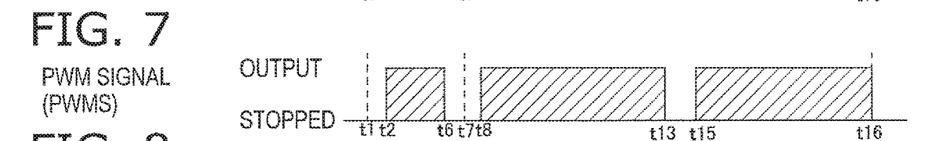
FIG. 7 is a timing chart for describing timings when a PWM signal is stopped.
Figure 14:
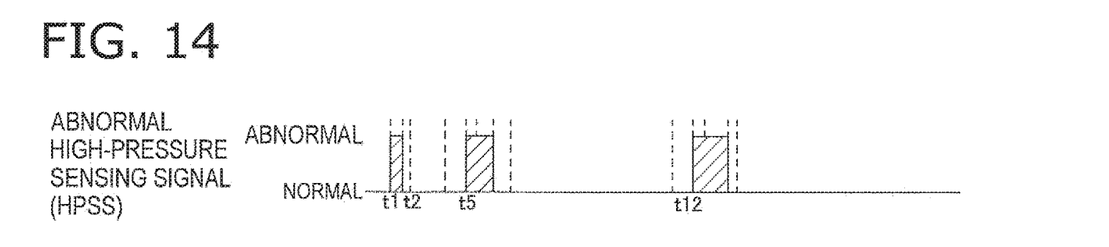
FIG. 14 is a timing chart showing timings when a abnormal high-pressure sensing signal is transmitted from an abnormality notification signal transmission circuit.

The working from when the high-pressure abnormality notification signal HPS is transmitted from the high-pressure abnormality sensing component 41 at time t10 to until the operation of the compressor 31 is stopped is working when the compressor 31 is stopped because of the CPU 63. At this time, at time t11 the second mechanical relay RY2 opens, and at time t12 a little later the first mechanical relay RY1 switches from the break contact CP2 (A contact) to the make contact CP3 (B contact). Because of this switching of the first mechanical relay RY1, the abnormal high-pressure sensing signal HPSS is transmitted from the abnormality notification signal transmission circuit 66 to the CPU 63 as shown in FIG. 14. As a result, the transmission of the PWM signal PWMS from the CPU 63 is stopped as shown in FIG. 7, whereby the transmission of the gate signal GS from the PWM drive circuit 65 is stopped as shown in FIG. 12 and the operation of the compressor 31 is stopped as shown in FIG. 13. It will be noted that at time t14 the voltage V1 of the inverter drive power supply PS2 to the PWM drive circuit 65 is cut off by the first mechanical relay RY1, but the disconnection of the voltage V1 by the first mechanical relay RY1 does not affect the stopping of the operation of the compressor 31 because at this time the transmission of the PWM signal PWMS to the PWM drive circuit 65 is already stopped.

Furthermore, the high-pressure abnormality is eliminated a little after time t3 and the high-pressure abnormality notification signal HPS from the high-pressure abnormality sensing component 41 is cancelled. As shown in FIG. 9, the second mechanical relay RY2 closes a little after the cancellation of the high-pressure abnormality notification signal. As a result of the second mechanical relay RY2 closing, the fourth connection port X4A and the first connection port X1A close and the first mechanical relay RY1 switches from B contact to A contact. As a result, the voltage V1 is applied to the PWM drive circuit 65, and output of the gate signal GS from the PWM drive circuit 65 becomes possible. Here, the CPU 63 performs masking from the abnormality notification signal transmission circuit 66 considering the lag time from the cancellation of the high-pressure abnormality notification signal HPS to until the voltage V1 is applied to the PWM drive circuit 65, and the CPU 63 starts the transmission of the PWM signal PWMS from the CPU 63 to the PWM drive circuit 65 from time t15 a little after the output of the abnormality notification signal from the abnormality notification signal transmission circuit 66 stops. As a result, the transmission of the gate signal GS from the PWM drive circuit 65 is started, and the application of the alternating-current voltage by the inverter 61 and the operation of the compressor 31 are resumed.

Figure 6:
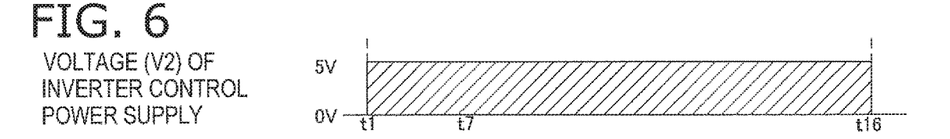
FIG. 6 is a timing chart showing a change in a voltage of an inverter control power supply.

Finally, when the commercial power supply PS1 is switched off at time t16, power is not supplied to the control board PCB2 or the inverter board PCB1, and the voltage V1 of the inverter drive power supply PS2, the inverter control voltage V2 of the inverter control power supply PS3 (see FIG. 6), and the voltage V3 of the control board power supply PS4 all become 0 V. Furthermore, the first mechanical relay RY1 switches from the break contact CP2 (A contact) to the make contact CP3 (B contact), and the second mechanical relay RY1 becomes open.

(4) Characteristics
(4-1)

As described above, the inverter drive power supply PS2 of the PWM drive circuit 65 is cut off by the first mechanical relay RY1 when a high-pressure abnormality has been detected in the high-pressure abnormality sensing component 41 in the air conditioner 10 and stopping the driving of the compressor 31 has been requested. The inverter motor 80 and the compressor 31 having the built-in inverter motor 80 are actuators. The inverter drive power supply PS2 is cut off in this way, and the contacts switch to a mechanically unconnected state because the contacts are mechanically opened and closed inside the first mechanical relay RY1. The drive signal with respect to the inverter 61 is certainly changed as a result of the contacts becoming mechanically opened inside the first mechanical relay RY1, and the inverter 61 that had been driven is certainly stopped. When an abnormality in the air conditioner 10 has been sensed and stopping the driving of the inverter motor 80 of the compressor 31 has been requested, the driving of the inverter 61 can be certainly stopped and the certainty with which the driving of the compressor 31 is stopped is improved. Furthermore, even if a glitch occurs, such as the first mechanical relay RY1 not working because of a line break, for example, safety is maintained because the first mechanical relay RY1 maintains the state in which the common contact CP1 is connected to the make contact CP3.

It will be noted that although in the above embodiment the inverter motor 80 of the compressor 31 was taken as an example and described, the invention of this application can also be applied to the inverter motor 70 of the indoor fan 22 and/or the inverter motor 90 of the outdoor fan 37, and in that case also the same effects are achieved.

(4-2)

The first mechanical relay RY1 is configured to include the common contact CP1 connected to the inverter drive power supply PS2 of the PWM drive circuit 65, the break contact CP2 connected to the PWM drive circuit 65, and the make contact CP3 connected to the abnormality notification signal transmission circuit 66. Because the first mechanical relay RY1 is configured in this way, disconnection of the inverter drive power supply PS2 from the PWM drive circuit 65 and notification of an abnormality by application of the voltage V1 to the abnormality notification signal transmission circuit 66 can be performed together with one action of the first mechanical relay RY1, so abnormality sensing can be swiftly and certainly performed, and the CPU 63 (an example of a microcomputer) can be reduced from erroneously sensing an abnormality other than an abnormality involving the first mechanical relay RY1. Because of the above configuration, the inverter driver 62 with which the stopping of the inverter drive power supply PS2 of the PWM drive circuit 65 and abnormality sensing can be swiftly and certainly performed can be inexpensively provided.

(4-3)

The high-pressure abnormality sensing component 41 capable of outputting a request to stop the driving of the inverter motor 80 of the compressor 31 is connected via the control board PCB2 to the first connection port X1A as a device one wants to have output a request to stop the driving of an actuator. The first mechanical relay RY1 can work in such a way that ordinarily the first connection port X1A is closed by the high-pressure abnormality sensing component 41 and when an abnormality has been detected the first connection port X1A is opened and switched to an open state by the high-pressure abnormality sensing component 41 to disconnect the inverter drive power supply PS2 of the PWM drive circuit 65. A device such as the high-pressure abnormality sensing component 41 that senses an abnormality in the air conditioner 10 in this way and requests the stopping of the driving of the actuator can be easily connected using the first connection port X1A.

(4-4)

The first mechanical relay RY1 is attached to the inverter board PCB1. The inverter board PCB1 is a first board. The second mechanical relay RY2 is attached to the control board PCB2 that is separate from the inverter board PCB1. The control board PCB2 is a second board. Because it has this kind of configuration, the control board PCB2 can be provided in a place where the inverter board PCB1 is not provided. For example, the control board PCB2 can be disposed on the front side of the outdoor unit 30 and the inverter board PCB1 can be disposed on the back side of the outdoor unit 30 so that it is easy to perform maintenance and settings of the air conditioner 10. Furthermore, because a higher voltage is supplied to the inverter board PCB1 than to the control board PCB2, the control board PCB2 and the inverter board PCB1 can be partitioned from each other by a partition plate (not shown in the drawings) so that during maintenance and setting work the worker does not touch the inverter board PCB1. That is to say, the first board and the second board can be configured so that if the first board is provided in a closed-off space, the second board can be provided in an openable space, and connection of the second mechanical relay RY2 and the high-pressure abnormality sensing component 41 can be easily carried out.

In this way, if the high-pressure abnormality sensing component 41 that is a device one wants to have output a request to stop the driving of the actuator is provided in a place where it is easy to connect—for example, if the control board PCB2 is disposed on the front side when the compressor 31 is disposed on the front side of a machine compartment-connection of the second mechanical relay RY2 and the high-pressure abnormality sensing component 41 can be easily carried out. In this way, connection of the first mechanical relay RY1 and the high-pressure abnormality sensing component 41 that is a device that requests the stopping of the driving of the actuator when an abnormality in the air conditioner 10 has been sensed becomes easy through the intervention of the first connection port X1A and the second mechanical relay RY2.

(4-5)

The second connection port X2A is connected in series to the first connection port X1A and the first mechanical relay RY1. Because of this configuration, the line including the first connection port X1A and the first mechanical relay RY1 can be opened by the second connection port X2A even if the first connection port X1A is not opened, and because of the emergency stop circuit 110 the first mechanical relay RY1 can certainly change the gate signal GS with respect to the inverter 61 to certainly stop the inverter that had been driven. As a result, the certainty with which the driving of the inverter motor 80 of the compressor 31 is stopped by the emergency stop circuit 110 is improved. It will be noted that the gate signal GS is a drive signal output from the drive circuit to the inverter.

(4-6)

Masking is performed by the CPU 63 when the inverter driver 62 is powered on, so even when the CPU 63 quickly switches to a working state, a glitch where the CPU 63 tries to cause the gate signal GS to be output from the PWM drive circuit 65 while the disconnection of the PWM drive circuit 65 by the first mechanical relay RY1 is not cancelled can be avoided. As a result, the occurrence of glitches at the time of the startup of the air conditioner 10 caused by using the first mechanical relay RY1 that is slow to work is prevented.

(4-7)

There are cases where the inverter 61 is stopped by the CPU 63 quicker than in a case where the inverter 61 is stopped by just the first mechanical relay RY1, such as in the working from time t10 on described using FIG. 5 to FIG. 15, and in such cases the time until stopping when there is an abnormality in the inverter motor 80 of the compressor 31 can be further shortened. As a result, the protection of the compressor 31 and the inverter motor 80 of the compressor 31 can be improved.

(5) Modifications (5-1) Modification 1A

In the above embodiment, a case was described where the inverter drive power supply PS2 of the PWM drive circuit 65 is cut off by the first mechanical relay RY1, but the first mechanical relay RY1 may also be disposed between the PWM drive circuit 65 and the inverter 61 and configured to be capable of cutting off the gate signal GS that is a drive signal when a high-pressure abnormality has been detected in the high-pressure abnormality sensing component 41 in the air conditioner 10 and stopping the driving of the inverter motor 80 of the compressor 31 that is an actuator has been requested. In that case, assuming that there are six signal lines connected from the PWM drive circuit 65 with respect to the inverter 61, it suffices for one signal line to be cut off by the one first mechanical relay RY1 and for the other five signal lines to be cut off by the other five mechanical relays. It will be noted that when the inverter driver 62 is configured to be capable of cutting off the gate signal GS that is a drive signal, the inverter drive power supply PS2 and the inverter control power supply PS3 can also be commonalized.

(5-2) Modification 1B

In the above embodiment, a case was described where the commercial power supply PS1 is a three-phase alternating current, but the commercial power supply is not limited to a three-phase alternating current. For example, the commercial power supply may also be a two-phase alternating current.

REFERENCE SIGNS LIST

10 Air Conditioner
22 Indoor Fan
37 Outdoor Fan
31 Compressor
61 Inverter
62 Inverter Driver
63 CPU (Example of a Microcomputer)
65 PWM Drive Circuit (Example of a Drive Circuit)
66 Abnormality Notification Signal Transmission Circuit
70, 80, 90 Inverter Motors
CP1 Common Contact
CP2 Break Contact
CP3 Make Contact
PCB1 Inverter Board (Example of a First Board)
PCB2 Control Board (Example of a Second Board)
RY1 First Mechanical Relay
RY2 Second Mechanical Relay
PS2 Inverter Drive Power Supply
PS3 Inverter Control Power Supply
X1A First Connection Port
X2A Second Connection Port

CITATION LIST

Patent Literature

Patent Document 1: JP-A No. 2007-107781
Patent Document 2: Japanese Patent No. 4,151,188

What is claimed is:

1. An inverter driver of an air conditioner driving an inverter of an actuator that actuates the air conditioner, the inverter driver comprising:
    a drive circuit configured to output a drive signal to the inverter;
    a microcomputer configured to control the drive circuit;
    a first mechanical relay connected to the drive circuit, the first mechanical relay being configured to cut off an inverter drive power supply of the drive circuit or to cut off the drive signal of the drive circuit;
    an inverter control power supply configured to continually supply power to the microcomputer; and
    an abnormality notification signal transmission circuit configured to transmit an abnormality notification signal to the microcomputer,
    the first mechanical relay including
        a common contact connected to the inverter drive power supply of the drive circuit,
        a break contact connected to the drive circuit, and
        a make contact connected to the abnormality notification signal transmission circuit,
    the first mechanical relay cutting off the inverter drive power supply of the drive circuit or the drive signal of the drive circuit in response to an abnormality being detected in the air conditioner and a request to stop the driving of the actuator being received.

2. The inverter driver of the air conditioner according to claim 1, further comprising
    a first connection port configured to actuate the first mechanical relay to open, thereby cutting off the inverter drive power supply of the drive circuit or the drive signal of the drive circuit, in response to the request to stop the driving of the actuator being received.

3. The inverter driver of the air conditioner according to claim 2, further comprising
a second mechanical relay connected to the first connection port and receiving the request to stop the driving of the actuator; and
a first board and a second board being separate from each other and to which the first mechanical relay and the second mechanical relay are respectively attached.

4. The inverter driver of the air conditioner according to claim 2, further comprising
a second connection port connected in series to the first connection port and the first mechanical relay, and the second connection port being connected to an emergency stop circuit that is opened in an emergency stop situation.

5. The inverter driver of the air conditioner according to claim 1, wherein
the actuator is a compressor, and
the abnormality is a high-pressure abnormality detected in the compressor.

6. The inverter driver of the air conditioner according to claim 1, wherein
in response to the inverter driver being powered on, the microcomputer performs masking that hinders performing of control that causes the drive circuit to make the actuator run until the first mechanical relay connects the inverter drive power supply of the drive circuit or the drive signal of the drive circuit from a cut off state.

7. The inverter driver of the air conditioner according to claim 1, wherein
in response to the request to stop the driving of the actuator, the microcomputer performs control that causes the drive circuit to output the drive signal so as to stop the inverter.

8. The inverter driver of the air conditioner according to claim 3, further comprising
a second connection port connected in series to the first connection port and the first mechanical relay, and the second connection port being connected to an emergency stop circuit that is opened in an emergency stop situation.

9. The inverter driver of the air conditioner according to claim 2, wherein
the actuator is a compressor, and
the abnormality is a high-pressure abnormality detected in the compressor.

10. The inverter driver of the air conditioner according to claim 2, wherein
in response to the inverter driver being powered on, the microcomputer performs masking that hinders performing of control that causes the drive circuit to make the actuator run until the first mechanical relay connects the inverter drive power supply of the drive circuit or the drive signal of the drive circuit from a cut off state.

11. The inverter driver of the air conditioner according to claim 2, wherein
in response to the request to stop the driving of the actuator, the microcomputer performs control that causes the drive circuit to output the drive signal so as to stop the inverter.

12. The inverter driver of the air conditioner according to claim 5, wherein
in response to the inverter driver being powered on, the microcomputer performs masking that hinders performing of control that causes the drive circuit to make the actuator run until the first mechanical relay connects the inverter drive power supply of the drive circuit or the drive signal of the drive circuit from a cut off state.

13. The inverter driver of the air conditioner according to claim 5, wherein
in response to the request to stop the driving of the actuator, the microcomputer performs control that causes the drive circuit to output the drive signal so as to stop the inverter.

14. The inverter driver of the air conditioner according to claim 6, wherein
in response to the request to stop the driving of the actuator, the microcomputer performs control that causes the drive circuit to output the drive signal so as to stop the inverter.

* * * * *